United States Patent [19]

Uriuhara et al.

[11] Patent Number: 4,685,062
[45] Date of Patent: Aug. 4, 1987

[54] START CONTROL METHOD FOR AUTOMATIC CLUTCH

[75] Inventors: Makoto Uriuhara, Yokohama; Atsushi Ohmori, Tokyo, both of Japan

[73] Assignee: Isuzu Motors Limited, Tokyo, Japan

[21] Appl. No.: 686,522

[22] Filed: Dec. 26, 1984

[30] Foreign Application Priority Data

Dec. 30, 1983 [JP] Japan ................. 58-245852

[51] Int. Cl.⁴ .............. B60K 41/22; F16D 27/16; G05D 17/02
[52] U.S. Cl. ............... 364/424.1; 192/0.058; 192/0.076; 192/3.58
[58] Field of Search ............... 364/424.1; 192/0.058, 192/0.076, 0.092, 3.58

[56] References Cited

U.S. PATENT DOCUMENTS

| | | | |
|---|---|---|---|
| 4,295,551 | 10/1981 | Zimmermann et al. | 192/0.076 |
| 4,487,303 | 12/1984 | Boueri et al. | 192/3.58 |
| 4,518,068 | 5/1985 | Oguma et al. | 192/0.076 X |
| 4,527,678 | 7/1985 | Pierce et al. | 192/3.58 |
| 4,558,772 | 12/1985 | Grimes et al. | 192/0.076 |
| 4,561,530 | 12/1985 | Parsons et al. | 192/0.076 |

Primary Examiner—Felix D. Gruber
Attorney, Agent, or Firm—Staas & Halsey

[57] ABSTRACT

Herein disclosed is a method of controlling an automatic clutch when starting to move a vehicle such as an automobile having an automatic transmission. The maximum accelerating r.p.m. of an engine at the start is detected and stored so that a clutch actuator is kept deenergized to leave the clutch released, while the engine r.p.m. detected is lower than the maximum value stored, but is energized again to apply the clutch when the engine r.p.m. exceeds the maximum value. More specifically, the running state of the vehicle is detected to determine the operating speed of the clutch actuator, and the automatic clutch is applied at the operating speed deterined. The engine r.p.m., once the vehicle is moving is detected and compared with the maximum accelerating engine r.p.m. Then, the operating speed of the clutch actuator is dropped to zero to interrupt engagement of the clutch while the engine r.p.m. detected is smaller than the maximum engine r.p.m. Engagement of the clutch is restored when the engine r.p.m. again exceeds the maximum value.

2 Claims, 11 Drawing Figures

START CONTROL METHOD FOR AUTOMATIC CLUTCH

BACKGROUND OF THE INVENTION

1. Field of the Invention

The present invention relates to an automatic clutch for a vehicle such as an automobile and, more particularly, to a method of controlling the automatic clutch when the vehicle is to be moved.

2. Description of the Prior Art

In recent years, vehicle automatic transmissions have been used more widely so as to facilitate driving operation. Such a vehicle can use an automatic clutch in which a hydraulic actuator controlled by an electronic control unit drives a friction clutch (e.g., a dry-type, single plate clutch).

As a control method of the automatic clutch of the above-specified kind when starting to move such a vehicle, there have been proposed in the prior art a method, by which application of the clutch is changed in accordance with the rise in the r.p.m. (i.e., the number of revolutions per minute) of an engine (as is disclosed in Japanese Patent Laid-Open No. 50-12648, for example), and a method by which the applying speed of the clutch is changed depending upon the engine r.p.m. (as is disclosed in Japanese Patent Laid-Open No. 52-51117, for example).

In both of these control methods, however, the clutch applying operation is conducted after the engine r.p.m. has risen. This invites the following disadvantages: (i) not only the useful life of the clutch but also the mileage of the vehicle is lessened because the engine r.p.m. has already been increased to a considerably high value before the clutch is applied, while the vehicle itself is stopped, so that the engine is idly accelerated and the clutch slips to a large extent in its partially applied state; and (ii) the start responsiveness of the vehicle is seriously degraded because it takes a considerable period before the engine r.p.m. is recovered after an accelerator pedal has been depressed and because the clutch is controlled in accordance with the recovery. Since the vehicle is reluctant to start if the start responsiveness is bad, moreover, the accelerator pedal is further depressed which further adversely affects the vehicle by aggravating the first disadvantage.

In order to overcome these disadvantages, a start control method has been proposed in which the rate of change of the engine r.p.m. is detected to apply the clutch at a speed corresponding to the depression of the accelerator pedal, while it is positive to interrupt application of the clutch, when it becomes negative, and to again apply the clutch when a positive value is restored.

In the case of this control method, however, it is necessary to measure accurately the range of change of the engine r.p.m. This accurate measurement can be ensured, when fluctuations in the engine r.p.m. are small as in a gasoline engine, but is difficult when r.p.m. fluctuations are large as in a Diesel engine. As a result, delay in the timing to release the clutch will drop seriously the engine r.p.m. to cause an engine to stop or to knock. If the clutch is released prematurely, on the contrary, there arises another disadvantage in that the engine r.p.m. is accelerated while idling.

SUMMARY OF THE INVENTION

In order to solve the problems concomitant with the prior art, therefore, an object of the present invention is to provide a controlling method for an automatic clutch, which can ensure a smooth and efficient start of a vehicle.

Another object of the present invention is to provide an automatic clutch controlling method which elongates the useful life of the automatic clutch and improves the mileage of the vehicle by preventing the idle acceleration of the engine and by minimizing the slippage of the clutch while being partially engaged.

Still another object of the present invention is to provide an automatic clutch controlling method which allows the vehicle to have a quick start responsiveness.

A further object of the present invention is to provide an automatic clutch controlling method which can ensure proper clutch timing to prevent the engine from stopping or knocking.

In order to achieve the above-specified objects, according to the present invention, the maximum accelerating r.p.m. of an engine at a start is detected and stored so that a a clutch actuator is kept deenergized to leave the clutch unengaged, while the engine r.p.m. is lower than the maximum value stored, but is energized again to apply the clutch when the engine r.p.m. exceeds the maximum value.

According to a preferred embodiment of the present invention, there is provided a method of controlling an automatic clutch at the start of a vehicle having an automatic transmission, comprising the steps of:

(a) detecting the operation of said vehicle to determine the operating speed "CLT:SPD" of a clutch actuator for actuating said automatic clutch;

(b) applying said automatic clutch at the operating speed CLT:SPD determined, (c) detecting te actual r.p.m. "Ne" of an engine at the vehicle start to compare it with the maximum accelerating engine r.p.m. "Nmax";

(d) dropping the operating speed CLT:SPD of said clutch actuator to zero to interrupt engagement of the clutch of said step (b) while the actual engine r.p.m. Ne detected is smaller than said maximum engine r.p.m. Nmax; and (e) re-applying the clutch according to said step (b) when said actual engine r.p.m. Ne detected again exceeds said maximum engine r.p.m. Nmax.

BRIEF DESCRIPTION OF THE DRAWINGS

Other objects, features and advantages of the present invention will become apparent from the following description taken with reference to the accompanying drawings, in which.

DETAILED DESCRIPTION OF THE PREFERRED EMBODIMENTS

The present invention will be described in detail in the following in connection with the embodiment thereof with reference to the accompanying drawings.

Figure 1:
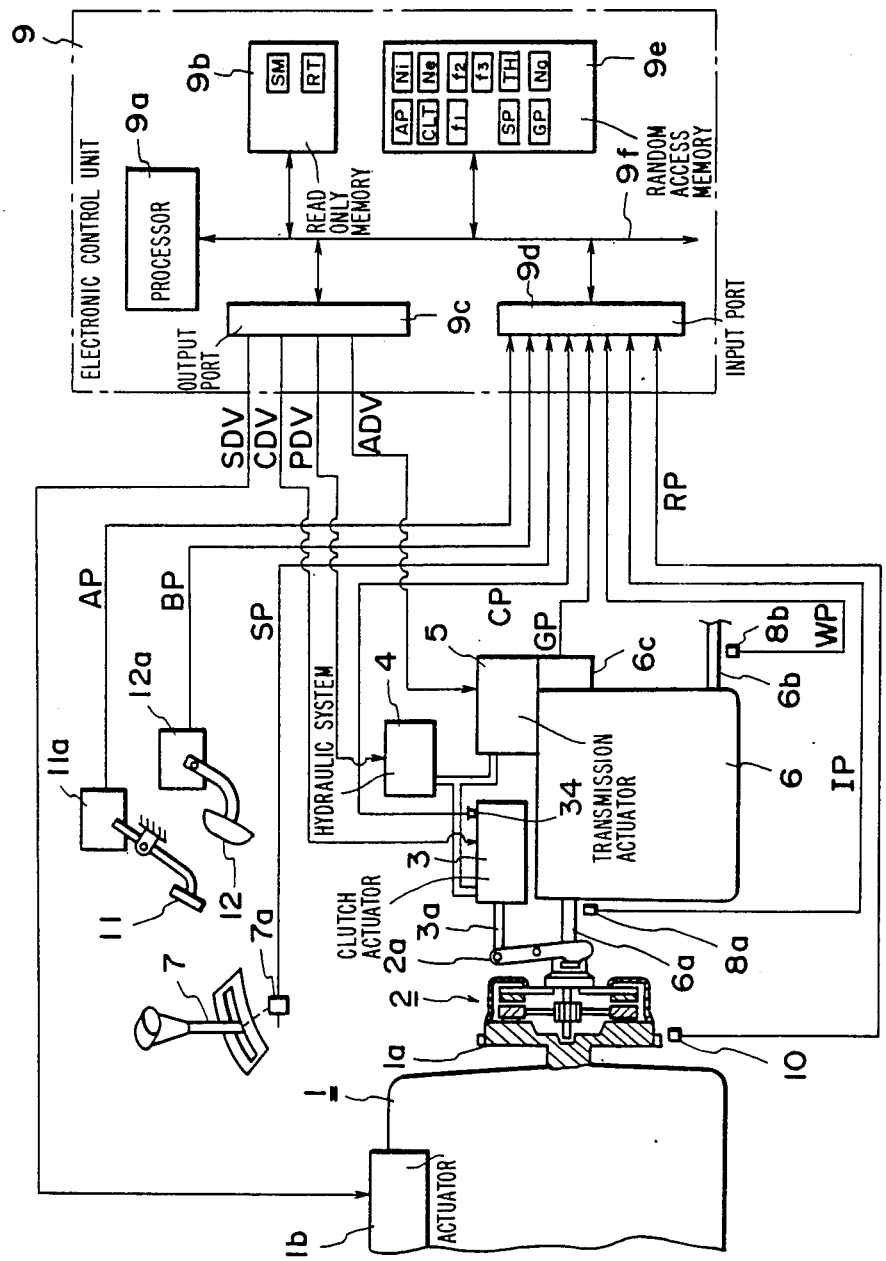
FIG. 1 is a diagrammatic view showing a synchromesh type automatic transmission having an automatic clutch controlled by the start control method according to one embodiment of the present invention.

In FIG. 1, showing the method embodying the present invention, reference numeral 1 indicates an engine which is equipped with: a throttle valve or a fuel injection pump for controlling the flow rate of an intake gas (such as air or an air-fuel mixture); a flywheel 1a; and an acutator 1b (which will be referred to hereinafter as a "throttle actuator") for driving or actuating the control lever of the throttle valve or the fuel injection pump. Indicated at numeral 2 is a clutch body which is constructed of friction elements of the known type and equipped with a release lever 2a. Indicated at numeral 3 is a clutch actuator which has its piston rod 3a adapted to drive the release lever 2a so as to control the extent of engagement of the clutch body 2. The clutch actuator 3 is equipped with a position sensor 34 for detecting the extent of engagement of the clutch 2 through the position of the piston rod 3a and applying the detected extent of engagement to an electronic control unit to be described in greater detail hereafter. Numerals 4 and 5 indicate a hydraulic system and a transmission acutator, respectively, which will be described hereinafter. Indicated at numeral 6 is a synchromesh-type automatic transmission which is driven by the transmission actuator 5 to conduct the speed changing operations. The automatic transmission 6 is equipped with an input shaft 6a connected to the clutch 2, an output shaft (or a drive shaft) 6b, and a grear position sensor 6c for detecting a speed position (or a gear position) and applying the detected speed position to the electronic control unit. Indicated at numeral 7 is a selector lever which is manipulated by a driver so that one of an "N" range (i.e., a neutral position), a "D" range (i.e., an automatic speed changing position), a "1st" range (i.e., a first speed), a "2nd" range (i.e., a second speed), a "3rd" range (i.e., an automatic speed changing position among the first, second and third speeds), and an "R" range (i.e., a reverse position) can be selected in accordance with the position of the selector lever 7. A selected position signal SP indicating a selected range is outputted from a select sensor 7a. Indicated at numeral 8a is a revolution sensor for detecting the r.p.m. IP of the input shaft 6a and applying this detected r.p.m. to the electronic control unit. Indicated at numeral 8b is a vehicle speed sensor for detecting the vehicle speed in terms of the r.p.m. of the drive shaft 6b and applying this detected r.p.m. to the electronic control unit. Indicated at numeral 10 is an engine revolution sensor for detecting the r.p.m. RP of the engine 1 in terms of the flywheel 1a and applying this detected r.p.m. to the electronic control unit. Generally indicated at numeral 9 is an electronic control unit which is constructed of a micro computer. This electronic control unit 9 is composed of: a processor 9a for arithmetic processing; a read only memory (which will be shortly referred to as an "ROM") 9b stored with a control program for controlling the automatic transmission 6, the clutch 3 and the throttle valve 1b; an output port 9c; an input port 9d; a random access memory (which will be shortly referred to as an "RAM") 9e for storing the computed results; and an address data bus (which will be shortly referred to as a "BUS") 9f connecting the foregoing components. The output port 9c is connected with the throttle actuator 1b, the clutch actuator 3, the hydraulic system 4, and the transmission actuator 5 for outputting drive signals SDV, CDV, PDV and ADV to drive them, respectively. The drive signal CDV is composed of drive signals CDV1, CDV2, and CDV3 and the drive signal ADV is composed of drive signals ADV1, ADV2, ADV3 and ADV4.

On the other hand, the input port 9d is connected with the clutch actuator 3 and various sensors 6c, 7a, 8a, 8b and 10, and sensors 11a, 12a, the latter two of which will be described in the following, for receiving the detected signals therefrom. The accelerator pedal 11 is equipped with the sensor (i.e., a potentiometer) 11a for generating a signal AP indicating the depth of depression of the accelerator pedal 11 and applying the signal AP to the electronic control unit 9. The brake pedal 12 is equipped with the sensor 12a (e.g., a switch) for generating a signal BP indicating the depth of depression of the brake pedal 12 and applying the signal BP to the electronic control unit 9.

Figure 2:
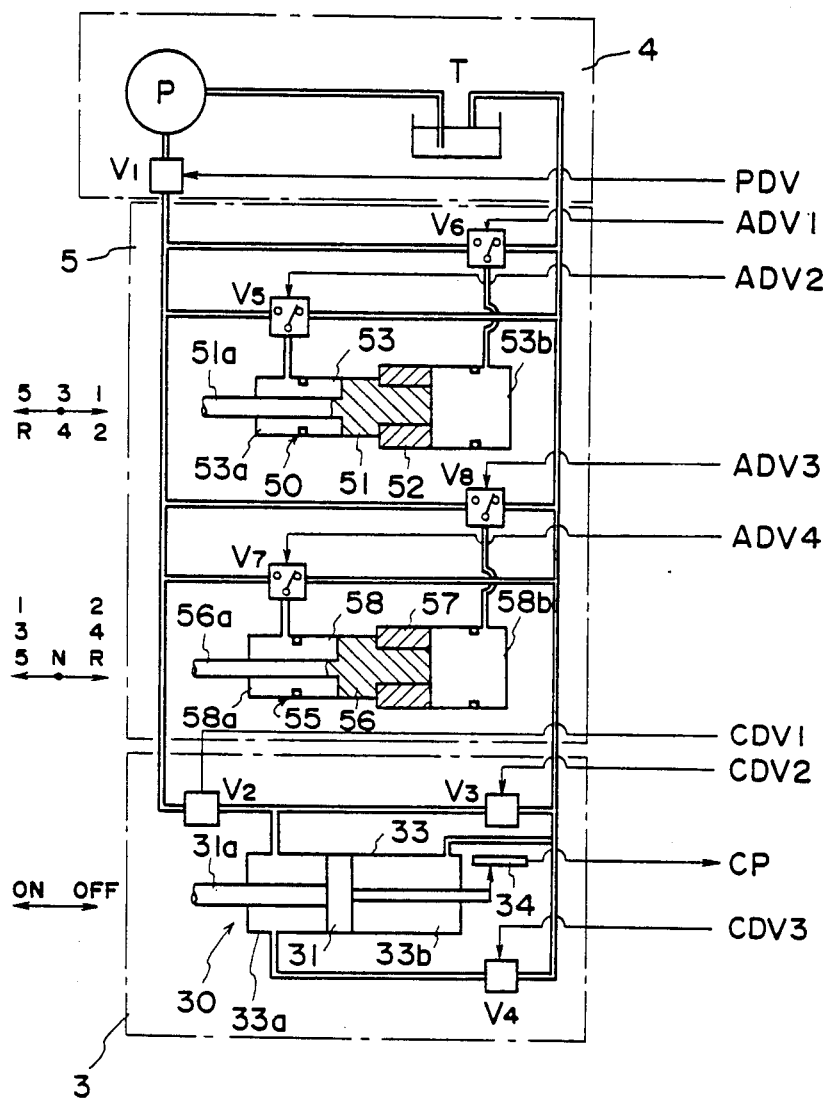
FIG. 2 is a schematic view showing the construction of a clutch actuator to be used with the automatic transmission of FIG. 1.

FIG. 2 shows the construction of the aforementioned clutch and transmission actuators and hydraulic system 3, 5 and 4. In FIG. 2, reference letters T, P and $V_1$ indicate a tank, an oil pump and an on-off valve, respectively, which make up the hydraulic system 4.

The clutch actuator 3 is composed of a cylinder 33, a piston 31 and a piston rod 31a (or 3a in FIG. 1) having one end connected to the piston 31 and the other end connected to the release lever 2a of the clutch 2. The clutch actuator 3 has one chamber 33a communicating through an on-off valve $V_2$ with the pump P (through the aforementioned on-off valve $V_1$) and through an on-off valve $V_3$ and a pulse-controlled on-off valve $V_4$ with the aforementioned tank T. On the other hand, another chamber 33b of the clutch acutator 3 is piped to communicate with the tank T at all times.

As a result, when the on-off valve $V_2$ is opened in response to a drive signal CDV1 from the output port 9c of the electronic control unit 9, oil pressure is applied to the chamber 33a so that the piston 31 is moved to the right, to disengage (or release) the clutch 2. When the on-off valves $V_3$ and $V_4$ are opened in response to drive signals CDV2 and CDV3, the oil pressure of the chamber 33a is released so that the piston 31 is moved to the left by the elastic force of a spring (not shown) disposed for engaging the clutch 2. Here, this clutch 2 is gradually engaged because the on-off valve V4 is pulse-driven in response to the drive signal CDV3.

The aforementioned transmission actuator 5 is composed of a select actuator 50 and a shift actuator 55. These select and shift actuators 50 and 55 are constructed to take three positions and are composed, respectively, of stepped cylinders 53 and 58, first pistons 51 and 56, and second pistons 52 and 57 made cylindrical to be fitted on the corresponding first pistons 51 and 56. These first pistons 51 and 56 have their respective rods 51a and 56a engaging with the not-shown interval levers of the transmission 6. The two actuators 50 and 55 thus constructed are shown in the neutral states when chambers 53a, 53b to be described later of the shift actuator 50 and chambers 58a, 58b to be described later of the select actuator 55 are communicated with pump P through change-over valves V5, V6, V7 and V8 to be described later in response to the signals ADV2, ADV1, ADV4 and ADV3 from the output port 9c and then oil pressure is exerted upon both the respective chambers 53a and 53b, and 58a and 58b of their stepped cylinders 53 and 58. When the oil pressure is applied to the respective chambers 53a and 58a, the first pistons 51 and 56 are moved to the right, as shown in FIG. 2, together with the second pistons 52 and 57. When the oil pressure is applied to the respective chambers 53b and 58b, on the contrary, only the first pistons 51 and 56 are moved to the left.

The chambers 53a and 53b of the select actuator 50 are made to communicate through the change-over valves V5 and V6, respectively, with the pump P (through the on-off valve V1) or the tank T. On the other hand, the chambers 58a and 58b of the shift actuator 55 are made to communicate through the change-over valves V7 and V8, respectively, with the pump P (through the on-off valve V1) or with the tank T.

As shown, therefore, the transmission 6 is in the neutral position. When the change-over valve V7 has its connection switched to the pump P in response to a drive signal ADV4 from the output port 9c whereas the change-over valve V8 is switched to the tank T in response to a drive signal ADV3 from the output port 9c, the transmission 6 establishes the fourth speed. When a speed change signal from the fourth speed to the fifth speed is generated, the change-over valves V8 and V7 first have their connections switched to the pump P in response to the drive signals ADV3 and ADV4 from the output port 9c thereby to return the shift actuator 55 to the shown neutral state. Then, the connection of the change-over valve V6 is switched to the pump P in response to a drive signal ADV1 from the output port 9c whereas the connection of the change-over valve V5 is switched to the tank T so that the select actuator 50 is shifted to a 5th-speed-reverese select position. Then, the change-over valve V8 has its connection switched to the pump P in response to the drive signal ADV3 from the output port 9c whereas the change-over valve V7 has its connection switched to the tank T so that the shift actuator 55 is shifted to a 5th-speed position thereby to change the speed of the transmission 6 to the 5th speed.

Thus, the speed changing operations to the respective speeds can be performed by switching the change-over valves V6 and V5, and V8 and V7 in response to the drive signals ADV1 and ADV2, and ADV3 and ADV4 from the output port 9c to alternately operate the select actuator 50 and the shift actuator 55.

Figure 3:
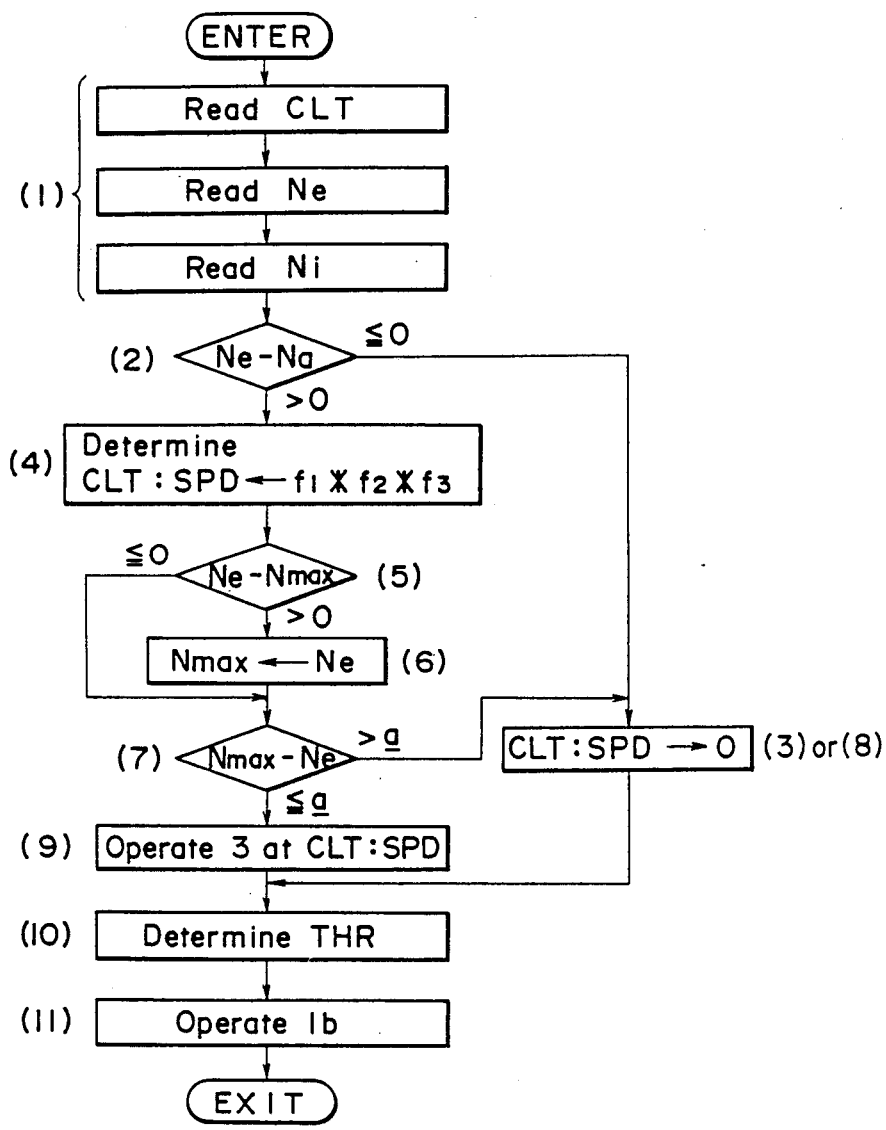
FIG. 3 is a flow chart showing the processing of the automatic clutch controlling method according to one embodiment of the present invention.

Next, the start control method having the construction of FIGS. 1 and 2 according to the present invention will be described with reference to the processing flow chart of FIG. 3.

It is first assumed that the vehicle is stopped, before the processing flow is entered, so that one (i.e., any of the "D", "1", "2" and "3" ranges) of the running ranges is selected by the select lever 7 and that the automatic transmission 6 is shifted to the "1st" speed position with the clutch 2 being disengaged. Specifically, when the select lever 7 is manipulated to the running range (e.g., the "D" range) so that the selected position signal SP of the "D" range is inputted from the position sensor 7a to the input port 9d, the processor 9a reads it through the BUS 9f to store it in the RAM 9e. Then, the processor 9a outputs the drive signal PDV to the hydraulic system 4 to open the on-off valve V1 and then selectively outputs the drive signals ADV1, ADV2, ADV3, and ADV4 to the transmission actuator 5 from the same so that the actuator 5 is driven to shift the transmission 6 to the 1st speed. At the same time, the processor 9a receives a selected gear signal GP from the gear position sensor 6c via its input port 9d to detect that the transmission 6 is shifted to the 1st speed, and stores it in the RAM 9e.

(1) The processor 9a reads in the extent of clutch engagement CLT from the position sensor 34 of the clutch actuator 3 via its input port 9d to store it in the RAM 9e. The processor 9a also reads in the actual r.p.m. (i.e., the revolutions per minute) Ne of the engine 1 from the engine revolution sensor 10 via its input port 9d to store it in the RAM 9e. The processor 9a further reads in the r.p.m. Ni of the input shaft 6a from the revolution sensor 8a via its input port 9d to store it in the RAM 9e.

Figure 4:
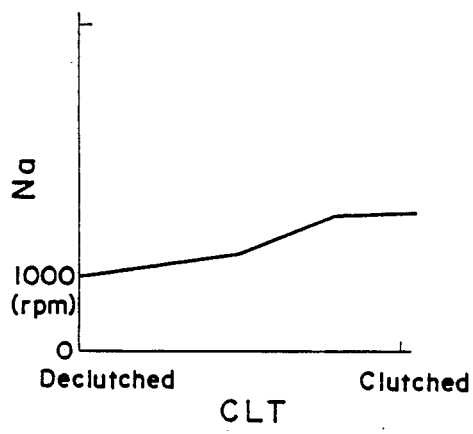
FIG. 4 is a graphic view showing a map to be used in the automatic clutch controlling method of the present invention, in which a reference value of the r.p.m. of an engine is plotted against the engaging extent of an automatic clutch.
Figure 5:
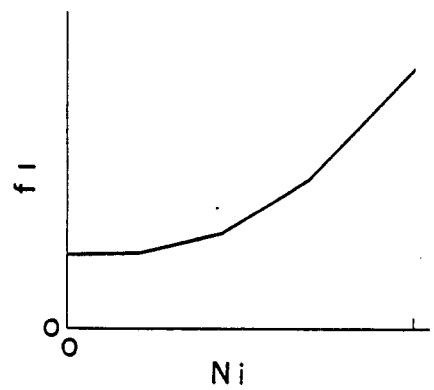
FIG. 5 is a graphic view showing a map to be used in the automatic clutch controlling method of the present invention, in which the operating speed of the clutch actuator is plotted against the r.p.m. of the input shaft of the automatic transmission.

(2) Next, the processor 9a searches for an engine r.p.m. reference value Na corresponding to the extent of clutch engagement CLT from the map data, which is predetermined and stored in advance in the RAM 9e, as shown in FIG. 4, to determine the corresponding reference value Na and derives its difference from engine r.p.m. Ne which was read in at the step (1). For $NE-Na \leq 0$, the processor 9a advances its processing to a subsequent step (3) by judging that the engine output power is insufficient for the clutching operation. For $Ne-Na>0$, on the contrary, the processor 9a judges that the engine r.p.m. Ne is sufficient for the clutching operation, and advances its processing to a later-described step (4).

(3) In case it is judged at the step (2) that the engine output power is insufficient for the clutching operation (i.e., for $Ne-Na \leq 0$), application of the clutch 2 will stop the engine 1. Therefore, if the clutch actuator 3 is conducting the clutching operation, the processor 9a drops the operating speed CLT:SPD of the clutch actuator 3 to zero thereby interrupting the clutch application.

Figure 6:
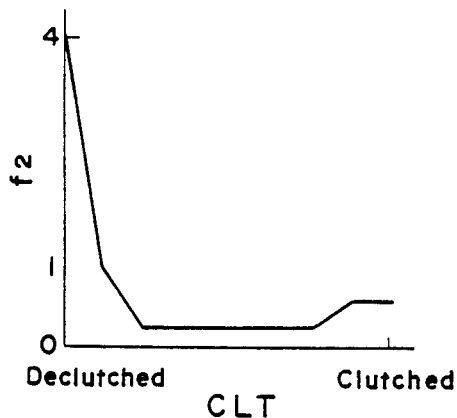
FIG. 6 is a graphic view showing a map to be used in the automatic clutch controlling method of the present invention, in which a coefficient for correcting the clutch acutator operating speed is plotted against the extent of clutch engagement.
Figure 7:
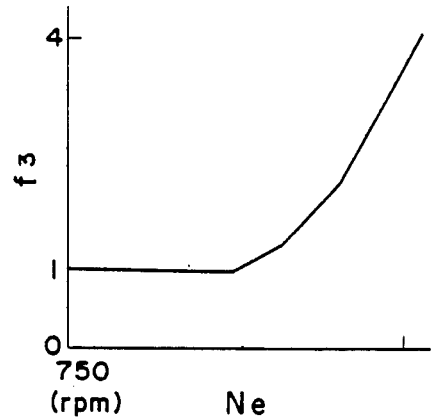
FIG. 7 is a graphic view showing a map to be used in the automatic clutch controlling method of the present invention, in which a coefficient for correcting the clutch acutator operating speed is plotted against the engine r.p.m.

(4) For $Ne-Na>0$, i.e., in case it is judged at step (2) that the clutch may be applied, the processor 9a determines the operating speed CLT:SPD of the clutch actuator 3. For this determination, the RAM 9e is stored in advance with the map data of the operating speed, i.e., the relation between the operating speed $f_1$ of the clutch actuator and the r.p.m. Ni of the input shaft 5a, as depicted in FIG. 6. Therefore, the processor 9a indexes that map data, which are stored in the RAM 9e, from the input shaft r.p.m. Ni to determine the operating speed $f_1$ corresponding to the input shaft r.p.m. Ni, and further determines both a clutch actuator's operating speed correcting coefficient $f_2$ corresponding to the extent of clutch engagement CLT from the map data which are stored in advance in the RAM 9e, as depicted in FIG. 6, and an operating speed correcting coefficient $f_3$ corresponding to the engine r.p.m., Ne from the map data which are also stored in advance in the RAM 9e, as shown in FIG. 7. Then, the processor 9a multiplies the aforementioned operating speed $f_1$ by those two coefficients $f_2$ and $f_3$ to determine the operating speed CLT:SPD of the clutch actuator 3.

(5) Next, the processor 9a reads in the engine r.p.m. Ne from the revolution sensor 10 via its input port 9d to determine the difference between the engine r.p.m. Ne and the maximum r.p.m. Nmax which has ever been reached, read in by the previous processing step and stored in the RAM 9e. For Ne−Nmax≦0, the processore 9a judges that the engine revolutions have dropped and advances its processing to a later-described step (7). Judging that the engine revolutions are increasing for Ne−Nmax>0, the processor 9a advances its processing to a subsequent step (6).

(6) If it is judged at the step (5) that Ne−Nmax>0, the processor 9a renews or replaces the maximum r.p.m. Nmax which has ever been reached, stored in the RAM 9e by the engine r.p.m. judged to be larger than the maximum r.p.m. Nmax and advances its processing to the subsequent step (7).

(7) Next, the processor 9a determines whether the difference of the maximum r.p.m. Nmax stored in the RAM 9e from the engine r.p.m. Ne is larger than a predetermined number a or not. In the case of Nmax−Ne>a, the processor 9a judges that the load on the engine has been augmented as a result of the clutching operation so that the engine r.p.m. has dropped to make the engine output power insufficient, and advances its processing to a subsequent step (8). Judging that the engine load has not been augmented for Nmax−N3≦a, on the contrary, the processor 9a advances its processing to a later step (9).

(8) In the aforementioned case of Nmax−Ne>a, the engine is stopped because of shortage of the engine output power if the clutch is applied. Therefore, the processor 9a drops the operating speed of the clutch actuator 3 to zero like the foregoing step (3) to interrupt clutch engagement.

(9) Next, the processor 9a sends the clutch actuator drive signal CDV of the operating speed CLT:SPD via its output port 9c to the clutch actuator 3 so that the piston rod 3a is gradually moved to the left by the clutch actuator 3. Thus, the clutching operation of the clutch actuator 3 is reopened to apply the clutch 2.

Figure 8:
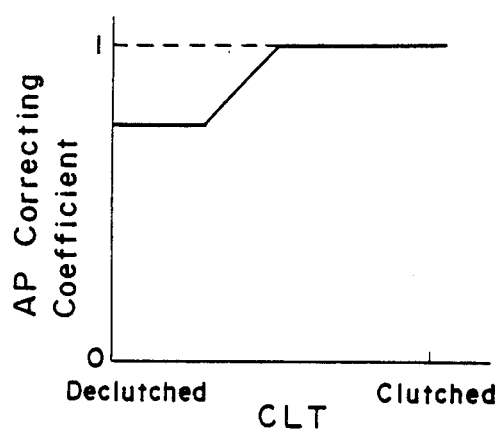
FIG. 8 is a graphic view showing a map to be used in the automatic clutch controlling method of the present invention, in which a coefficient for correcting the depression of an accelerator pedal is plotted against the extent of clutch engagement.

(10) Next, the processor 9a determines an accelerator pedal depression correcting coefficient for the clutch extent of clutch engagement CLT from the map data, which is stored in advance in the RAM 9e, as shown in FIG. 8, and multiplies the accelerator pedal depression AP by that correcting coefficient to determine a corresponding throttle opening THR representing the supply rate of fuel to the engine.

(11) Next, the processor 9a sends the throttle drive signal SDV of the throttle opening THR, which is determined at the step (10), via its output 9c to the throttle actuator 1b so that the throttle actuator 1b is driven to effect the throttle opening THR.

Figure 9:
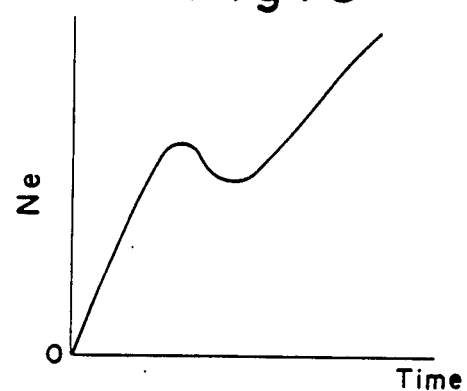
FIG. 9 is a graphic view showing the change of the engine r.p.m. with the lapse of time.
Figure 10:
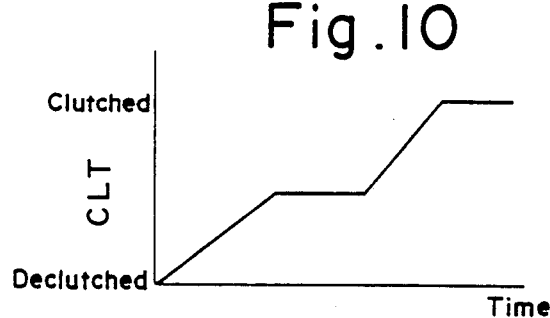
FIG. 10 is a graphic view showing the clutch engaging state according to the present invention and corresponding to the engine r.p.m. change of FIG. 9.

This cycle is repeated until the clutch 2 is applied. As a result, if the engine r.p.m. Ne, the input shaft r.p.m. Ni and the extent of clutch engagement CLT are changed, the applying speed CLT:SPD of the clutch 2 is changed in accordance with those changes. If, in this meanwhile, the engine r.p.m. Ne is exceeded by the maximum accelerating r.p.m. Nmax of the engine, the application of the clutch 2 is interrupted. If the engine r.p.m. Ne increases to exceed the aforementioned maximum r.p.m. Nmax, moreover, the clutch has its application controlled again by the operating speed CLT:SPD determined again. The changes of the engine r.p.m. Ne and the clutch engaging extent CLT by the start control described above are plotted against the lapse of time in FIGS. 9 and 10, respectively.

Thus, by repeating the steps (1) to (11), the clutching operation and the throttle control are effected so that the vehicle is started by the clutching operation at the optimum clutching speed and engine r.p.m.

After this, the processor 9a receives a detected speed signal WP from the speed sensor 8b via its input port 9d to compute the vehicle speed V and store it in the RAM 9e and locates the shift map from the speed V and the accelerator pedal depression AP of the RAM 9e to determine the optimum speed position.

Figure 11:
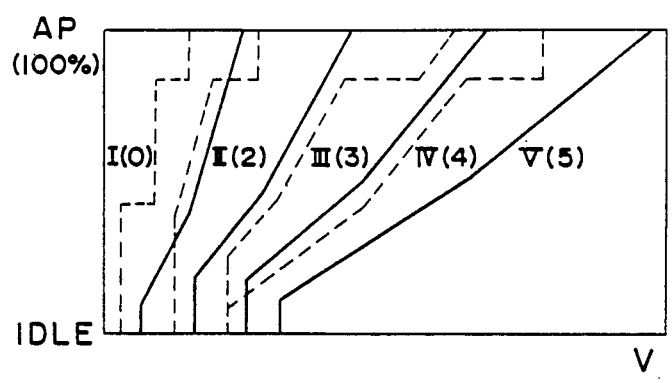
FIG. 11 is a graphic view showing a shift map for determining the speed change positions of the automatic transmission of FIG. 1.

Specifically, the ROM 9b is stored in the form of a table SM with the shift map which corresponds to the vehicle speed V and the depression AP, as shown in FIG. 11. In this Figure, the respective speed change positions are indicated by curves I, II, III, IV and V, of which solid curves indicate the boundaries for upshifting, whereas broken curves indicate the boundaries for downshifting, so that the upshifting map and the downshifting maps coexist.

From these shift maps, the processor 9a determines the optimum speed position for the vehicle speed V and for the depression AP. In case the optimum speed position thus determined is different from the current one of the transmission 6, the processor 9a sends the clutch drive signal CDV to the clutch actuator 3 via its output port 9c. Then, the oil pressure is applied to the chamber 33a of the cylinder 33 of the clutch actuator 3 to return the piston rod 3a (or 31a) to the right as viewed in FIG. 2, so that the release lever 2a is returned to the right to release the clutch 2. Next, the processor 9a feeds the transmission actuator 5 via its BUS 9f and output port 9c with the drive signal ADV for effecting selection of the gear of the optimum speed position determined.

As a result, the transmission actuator 5 is connected to the aforementioned hydraulic system 4 so that its built-in select and shift actuators 50 and 55 connected to the hydraulic system 4 are hydraulically controlled to bring the transmission 6 into the desired speed position.

Next, at the end of the shifting operation, the processor 9a sends the clutch drive signal CDV to the clutch actuator 3 to apply the clutch 2, thus completing the shifting operation.

In the embodiment thus far described, incidentally, the electronic control unit 9 is composed of the single processor 9a but may be composed of a plurality of processors to effect the distributed processing.

As has been described hereinbefore, according to the present invention, the maximum accelerating r.p.m. of an engine at a start is detected and stored so that a clutch actuator is kept deenergized to leave the clutch released, while the engine r.p.m. is lower than the maximum value stored, but is energized again to apply the clutch when the engine r.p.m. exceeds the maximum value. As a result, even in case the engine r.p.m. at the start of the vehicle highly fluctuates, the interrupting timing of the clutching operation can be determined accurately in accordance with the engine load corresponding to the extent of clutch engagement so that the start of the vehicle can be controlled smoothly without stopping or accelerated idling of the engine.

Incidentally, although the present invention has been described in connection with a preferred embodiment, it should be understood that the present invention can be modified in various manners within the range of the gist thereof and that the modifications should not be excluded from the scope thereof.

What is claimed is:

1. A method of controlling an automatic clutch when starting to move a vehicle having an engine and an automatic transmission with an input shaft, comprising the steps of:
   (a) detecting the extent of clutch engagement, the r.p.m. of the engine, and the r.p.m. of the input shaft of said vehicle;
   (b) searching for an engine r.p.m. reference value corresponding to the extent of clutch engagement detected in step (a) from a prescribed map data;
   (c) comparing the r.p.m. of the engine detected in step (a) with the engine r.p.m. reference value searched in step (b);
   (d) dropping the operating speed of a clutch actuator to zero to interrupt the application of the clutch, when the engine r.p.m. detected in step (a) is smaller than the engine r.p.m. reference value searched in step (b);
   (e) determining the operating speed of the clutch actuator, when the engine r.p.m. detected in step (a) exceeds the engine r.p.m. reference value searched in step (b);
   (f) replacing a maximum engine r.p.m. which has ever been reached with the engine r.p.m. which is detected in step (a), when the engine r.p.m. detected exceeds the maximum engine r.p.m.;
   (g) comparing the difference between the maximum engine r.p.m. and the engine r.p.m. detected in step (a) with a predetermined value;
   (h) operating the clutch actuator at the operating speed determined in step (e), when the difference is smaller than the predetermined value; and
   (i) dropping the operating speed of the clutch actuator to zero to interrupt the application of the clutch, when said difference is greater than said predetermined value.

2. An automatic clutch controlling method according to claim 1, wherein the operating speed of said clutch actuator is determined by multiplying an operating speed corresponding to the transmission input shaft r.p.m. by a correcting coefficient corresponding to the extent of clutch engagment detected in step (a) and a correcting coefficient corresponding to the engine r.p.m. detected in step (a).

* * * * *

UNITED STATES PATENT AND TRADEMARK OFFICE
CERTIFICATE OF CORRECTION

PATENT NO. : 4,685,062
DATED : Aug. 4, 1987
INVENTOR(S) : URIUHARA et al.

It is certified that error appears in the above-identified patent and that said Letters Patent is hereby corrected as shown below:

<u>Col. 5</u>

Line 15, delete "interval" and insert --internal--.

Signed and Sealed this

Twenty-ninth Day of March, 1988

Attest:

DONALD J. QUIGG

*Attesting Officer*  *Commissioner of Patents and Trademarks*